(12) United States Patent
Tingley et al.

(10) Patent No.: US 11,235,395 B2
(45) Date of Patent: Feb. 1, 2022

(54) CONTROLLED FRACTURE MACHINING METHOD FOR PRODUCING THROUGH-HOLES

(71) Applicant: Tennine Corp., Grand Rapids, MI (US)

(72) Inventors: William Q. Tingley, Grand Rapids, MI (US); William Q. Tingley, III, Grand Rapids, MI (US); Daniel R. Bradley, Grand Rapids, MI (US)

(73) Assignee: Tennine Corp., Grand Rapids, MI (US)

( * ) Notice: Subject to any disclaimer, the term of this patent is extended or adjusted under 35 U.S.C. 154(b) by 0 days.

(21) Appl. No.: 16/835,186

(22) Filed: Mar. 30, 2020

(65) Prior Publication Data

US 2020/0338643 A1 Oct. 29, 2020

Related U.S. Application Data (63) Continuation-in-part of application No. 14/638,547, filed on Mar. 4, 2015, now abandoned, which is a
(Continued)

(51) Int. Cl.
*B23B 1/00* (2006.01)
*B23B 3/24* (2006.01)
(Continued)

(52) U.S. Cl.
CPC ............... *B23B 1/00* (2013.01); *B23B 3/24* (2013.01); *B23D 5/00* (2013.01); *B23D 13/06* (2013.01); *B23B 2215/81* (2013.01)

(58) Field of Classification Search
CPC ...... B26F 1/00; B26F 1/02; B26F 1/12; B26F 1/14; B26F 1/24; B21D 28/02; B21D 28/04; B21D 28/24; B21D 28/26; Y10T 83/045; Y10T 83/041; Y10T 83/0414; Y10T 83/0524; Y10T 83/869; Y10T 83/647; Y10T 83/8821; Y10T 83/929; Y10T 225/10; Y10T 225/12; Y10T 225/30;
(Continued)

(56) References Cited

U.S. PATENT DOCUMENTS

| | | | | |
|---|---|---|---|---|
| 2,089,795 A | * | 8/1937 | Hodge | B21D 28/34 29/465 |
| 4,441,395 A | * | 4/1984 | McRoskey | B26F 1/0015 83/176 |

(Continued)

*Primary Examiner* — Phong H Nguyen
(74) *Attorney, Agent, or Firm* — Frank M. Scutch, III (57) ABSTRACT

A method and apparatus for producing a hole in any material by means of controlled fracturing using non-spindle CNC machining includes the steps of: fixturing a workpiece to the table of a non-spindle CNC holemaking machine tool. The cutting tool is then secured to the column of the machine tool and the face of the cutting tool is positioned perpendicular to the centerline of the proposed hole. The surface of the workpiece is approached with the cutting tool to a predetermined clearance level. Thereafter, the cutting tool is driven with sufficient linear force to induce instantaneous strain in the material of the workpiece to a depth necessary to create a hole of a desired size and shape using a drive mechanism. The cutting tool is then repositioned so that the face of cutting tool is perpendicular to centerline of a subsequent hole to be produced.

5 Claims, 3 Drawing Sheets

Related U.S. Application Data continuation-in-part of application No. 14/054,309, filed on Oct. 15, 2013, now abandoned, which is a continuation-in-part of application No. 12/791,146, filed on Jun. 1, 2010, now abandoned.

(60) Provisional application No. 61/225,673, filed on Jul. 15, 2009.

(51) Int. Cl.
    *B23D 5/00*     (2006.01)
    *B23D 13/06*     (2006.01)

(58) Field of Classification Search
    CPC ............ Y10T 225/304; Y10T 225/307; Y10T 225/379; Y10T 409/109063; Y10T 409/30868; Y10T 409/309576
    See application file for complete search history.

(56) References Cited

U.S. PATENT DOCUMENTS

| | | | | |
|---|---|---|---|---|
| 4,477,537 A * | 10/1984 | Blase | ............ | B21D 28/16 428/577 |
| 4,860,419 A * | 8/1989 | Hekman | ............ | B23D 31/003 29/888.09 |
| 5,083,490 A * | 1/1992 | Kakimoto | ............ | B26D 5/04 83/556 |
| 5,211,687 A * | 5/1993 | Loser | ............ | B26F 1/24 144/2.1 |
| 5,460,026 A * | 10/1995 | Schafer | ............ | B21D 28/28 72/55 |
| 5,666,840 A * | 9/1997 | Shah | ............ | B21D 28/28 72/336 |
| 5,669,866 A * | 9/1997 | Julian | ............ | B21D 28/246 483/1 |
| 6,468,453 B1 * | 10/2002 | Gaidjiergis | ............ | B26F 1/02 264/156 |
| 6,581,269 B2 * | 6/2003 | Someno | ............ | B21D 53/14 29/558 |
| 6,645,132 B2 * | 11/2003 | Yoshinaga | ............ | B23K 20/123 228/2.1 |
| 7,194,820 B2 * | 3/2007 | Schweiger | ............ | B21D 28/12 29/465 |
| 2007/0228100 A1 * | 10/2007 | Gonoe | ............ | B28D 5/0011 225/1 |
| 2010/0111632 A1 * | 5/2010 | Tingley, III | ............ | B23D 13/00 409/293 |
| 2011/0011227 A1 * | 1/2011 | Tingley, III | ............ | B26F 1/02 83/39 |

\* cited by examiner

CONTROLLED FRACTURE MACHINING METHOD FOR PRODUCING THROUGH-HOLES

FIELD OF THE INVENTION

The present invention relates generally to holemaking and more specifically to holemaking by means of controlled fracturing vis-a-vis primarily adiabatic shear banding, and to a lesser extent plastic deformation, using non-spindle computer numerical control (CNC) machine tools.

BACKGROUND OF THE INVENTION

The United States Air Force's Advanced Manufacturing Propulsion Initiative (AMPI) has identified limitations in current manufacturing technologies for machining cooling holes needed to maximize performance in advanced fighter aircraft turbine engines that generate thrust in the 25,000-pound class. Typical production methods for these holes are generally termed "small hole drilling". The processes for making these holes use techniques such as Electrical Discharge Machining (EDM), laser cutting, and hard tool drilling and are used on various turbine engine components. Although these processes operate to produce holes, there are number of problems associated with these machining methods that do not work well for meeting the current design and manufacturing demands of advanced fighter turbine engines.

These problems include a low productivity using small hole drilling in view of the complex arrangements of thousands of cooling holes in a single part as well as the lack of automation that gives rise to an inadequate process control. This inadequate process control generally occurs in view of a reliance upon an intensive operator intervention that is used to drill "on the fly". Problems can also be related to the lack of precision and repeatability in hole location and the absence of part-to-part compensation to avoid set-up difficulties in subsequent operations and mismatches with mating components. The inability to consistently and accurately measure hole features and the high cost, waste, and repeatability limitations for manufacturing small hole drilling electrodes for EDM can also be problematic. Further, heat generated by EDM, laser-cutting as well as the hard tool drilling that causes recasting of hole walls, micro-cracking, and de-lamination work to increase the risk of premature part failure. Severe limitations and inability of EDM, laser-cutting, and hard tool drilling to produce angled holes, non-round holes, and tapered or flared hole walls are also an issue in addition to the inability of EDM to machine non-metallic materials such as carbon fiber composites. When using these prior art processes, burrs, rough hole wall surfaces, and other finish defects inherent in hard tool drilling of metallic materials can occur as well as cracking, splitting, de-lamination, and other inherent defects in hard tool drilling of carbon fiber composite materials. Finally, laser-cutting produces a risk in burning part surfaces in the vicinity of the terminal end of a through-hole that is sometimes referred to as backwall strike damage.

Hence, the objective of AMPI is to identify a small hole drilling technology that overcomes many of these problems while funding development of a new process within a predetermined time period to Manufacturing Readiness Level 7—i.e., a proven manufacturing process ready for both low-rate initial production and full-rate production of turbine engine components having complex arrangements of thousands of cooling holes.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a fully scalable controlled-non-spindle CNC machining apparatus. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The processes for removing workpiece material is called "controlled fracturing" which occurs by applying an impact force that simultaneously exceeds the yield strength and the breaking strength of the workpiece material so to prevent plastic deformation. A controlled fracture is produced by an impact which causes an axial projection of banding along the perimeter of the tool to produce a repeatable, precise removal of workpiece material. As will be described herein, the controlled-fracture machining feature of the invention provides four key advantages over existing CNC machine tools: (1) Full scalability in size increasing the range of applications, (2) greater geometric complexity of the small through-hole pattern for improved performance of the completed workpiece, (3) greater precision and less distortion in machining thin cross-sections making possible greater reduction in mass, thus lowering the pressure needed to drive drilling and blanching cutting tools through the workpiece, and (4) ease of production reducing cost and time of manufacture while improving precision and dimensional accuracy.

Controlled-fracture machining overcomes these inherent limitations in the current use of CNC drilling and blanching machine tools for producing through-holes in a workpiece such as a the housing of the combustion chamber of a gas turbine. Controlled-fracture machining does not rely upon torque as a cutting force. The cutting tool is driven strictly by linear forces through the workpiece to machine to net shape its geometrically complex surface(s).

Thus, controlled-fracture machining to produce the desired through-hole or pattern of through-holes is induced in the workpiece using steps of applying an abrupt, localized, and substantially extreme force of a cutting tool against the workpiece. This force must be sufficient to exceed the ultimate shear strength of the material of the workpiece. When the force is applied, shear bands form in the workpiece as a microstructure of cracks emanating in the direction of the cutting tool within the outside contour of the cutting tool as projected into the workpiece. Under the continued force of the cutting tool moving through the workpiece, this microstructure softens relative to the uncut material surrounding it, because the cracked material becomes highly fractured, even to the point of recrystallizing. Once softened the cutting tool shears this material from the workpiece as waste retaining almost all of the heat generated by the process, because its microstructure of cracks retards the transfer of heat to material outside of the microstructure. The end result of this controlled-fracturing process is a shape cut into the workpiece with the same contour as the cutting tool.

The forces sufficient to propagate the shear bands for controlled fracture varies with the material of the workpiece. The cutting tool must apply at least 60,000 pounds of force per square inch (lbs/sq-in) of areal contact with the workpiece if it is cold-rolled mild steel, 80,000 pounds for alloy steel, 150,000 pounds for stainless steel, 50,000 pounds for titanium, and 20,000 pounds for aluminum. These forces can be applied as required to achieve the necessary surface footage for achieving controlled fracturing. More information regarding controlled-fracture machining is fully described in Applicant's U.S. Pat. No. 8,821,086 entitled METHOD AN APPARATUS FOR CONTROLLED FRACTURE MACHINING assigned to Tennine Corp. and incorporated by reference herein in its entirety.

Employing linear force by means of controlled-fracture machining eliminates restrictions on the shape and size of the cutting tool so that its cutting edge can more closely conform to the ideal design. This also keeps the cutting tool continuously in cut as it is driven through the workpiece and increases the rate of volumetric material removal by orders of magnitude over current methods of machining.

The various embodiments of the invention are fully scalable in size because controlled-fracture machining can produce the a through-hole or a pattern of through-holes in the workpiece of the ideal design. This is because controlled-fracture machining drives a cutting tool with linear force instead of torque and so the cutting tool does not have axial symmetry imposed upon it. It can be any shape the geometry of the workpiece's surface requires. Current methods of drilling and rotary-milling use rotating axially symmetric cutting tools that can only approximate the ideal design. As a consequence, the completed workpiece must be large enough so that this discrepancy in approximation is not so great as to significantly compromise the completed workpiece's performance. The controlled-fracture machining feature of the invention, by means of asymmetrical cutting tool driven by linear force overcomes this discrepancy so that smaller workpieces, such as the combustion chamber housing of a gas turbine, can be manufactured without compromising the integrity of their design and so their performance.

Those skilled in the art will recognize that the invention has the advantage of greater geometric complexity in the design of a through-holes and patterns of through-holes on non-linear surfaces of the workpiece. Like scalability, this greater geometric complexity is possible because of the controlled-fracture machining feature of the invention and its employment of linear-force driven asymmetrical cutting tools that can be shaped with the cutting edges and clearances needed to precisely machine, without clearance problems or interference with previously machined surfaces, to net shape of the ideal design of the perimeter and location of the through-hole.

Those skilled in the art will also recognize that controlled-fracture machining's use of linear force, as opposed to conventional milling's use of torque, to provide sufficient force to remove material from the workpiece enables the machining of very thin cross-sections with precision and no distortion or embrittlement from heat caused by the plastic deformation of milling. This permits the production of products with lesser or no distortion or undesirable hardening or burring of the through-hole in the workpiece. Thus, the performance of completed workpieces with precisely shaped and located through-holes is enhanced, especially in small gas turbines that are currently impractical or impossible to produce because of greater imprecision of the shape and location and greater distortion and undesirable hardening in through-holes and patterns of through-holes in the workpiece.

Aspects of the present invention offer an advantage of ease of production over existing CNC and manual methods of producing through-holes. Like the other key advantages, this is because of the controlled-fracture machining feature of the invention. Controlled-fracture machining employs linear force rather than torque, which milling by rotation of the cutting tool requires, to drive an asymmetric cutting tool through the workpiece to remove material. As a consequence, the volumetric rate of material removal by controlled-fracture machining is greater than milling by an order of one to two magnitudes. Furthermore, the material removal results in the ideal design net shape that requires no further processing rather than approximation of it through milling which may require further machining or handwork to produce an acceptable component. Additionally, this faster and simplified machining process makes possible cost-effective shorter runs of components. Overall, the invention's ease of production simplifies the manufacture, reduces the cost, shortens the production time, improves the precision and dimensional accuracy, and increases the flexibility of producing workpieces with through-holes or patterns of through-holes. In addition to making possible the manufacture of through-holes and patterns of through-holes in more complex and more advanced workpieces, especially those with non-linear surfaces, for new applications, these same advantages also make the invention useful for existing applications through improved performance, lower costs, faster production, and greater precision in manufacture.

Thus, embodiments of the present invention are especially directed to the production of complex through-holes and patterns of through-holes in workpieces using the process of controlled-fracture machining. By removing material from the workpiece through the use of controlled fracture, as opposed to plastic deformation of conventional drilling rotary-milling, or blanching, heat from the machining process is retained in the waste and not imparted to the workpiece. Therefore, thin and geometrically complex cross-sections can be machined without compromising the physical, structural, and dimensional integrity of the workpiece.

Controlled-fracture machining significantly increases the ease of production and the geometric complexity of through-holes and patterns of through-holes while manufacturing them more closely to their ideal design. Controlled-fracture machining also makes possible the manufacture of turbomachines, especially gas turbines, across the full scale of practical sizes. This is true in particular for smaller scale workpieces, because current methods are relatively crude and cannot reproduce the ideal design of the geometric complexity of through-holes and patterns of through-holes on non-linear surfaces of a workpiece. Therefore, using conventional methods to approximate the ideal design, only larger scale s workpieces are practical or even possible to manufacture.

Figure 1:
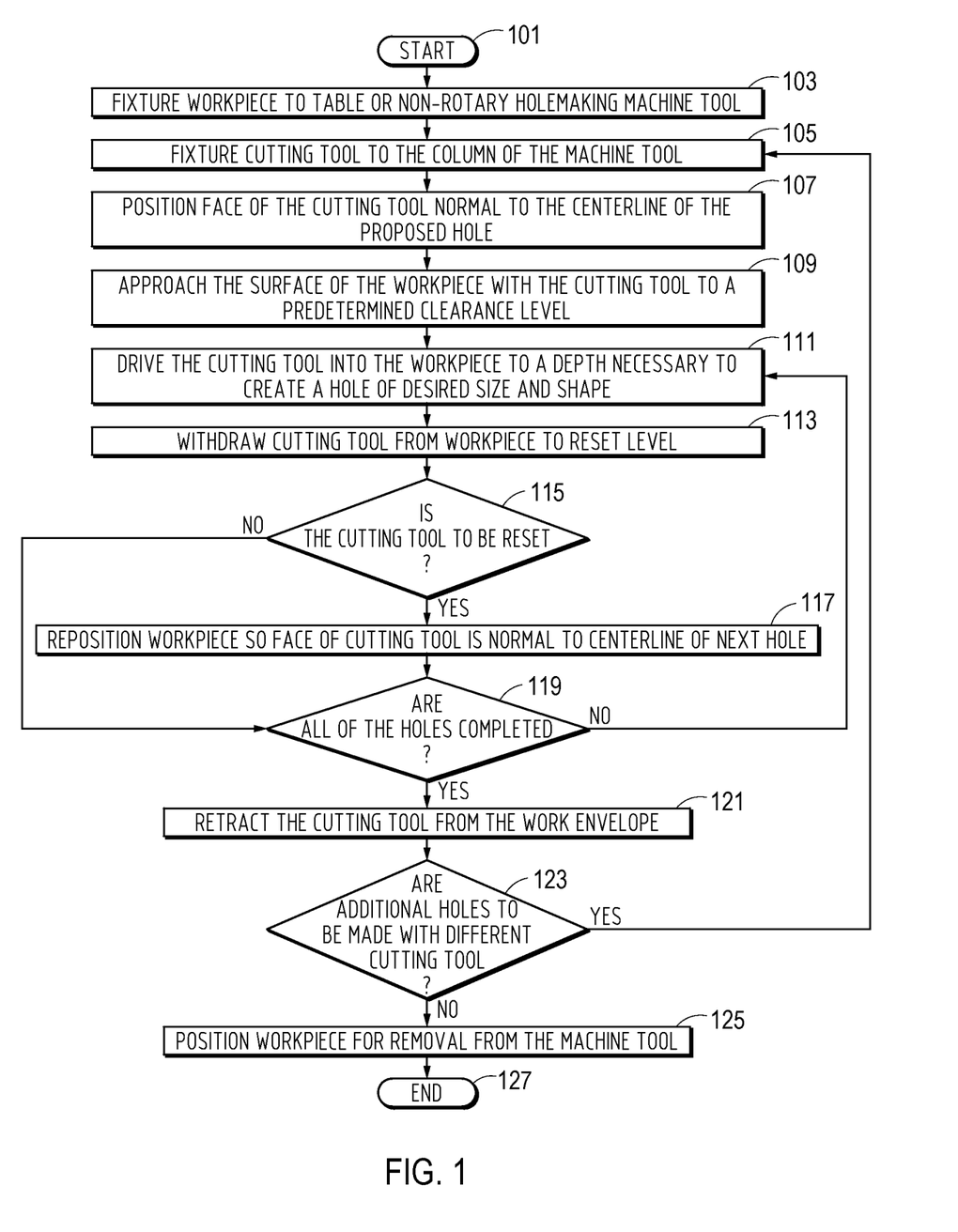
FIG. 1 is a flow chart diagram illustrating steps in accordance with an embodiment of the method of the invention.

In accordance with an embodiment of the invention, FIG. 1 illustrates a method non-spindle CNC holemaking that employs controlled fracturing as compared with plastic deformation of metallic, carbon fiber composite, and other materials to rapidly and precisely produce small holes within a wide range of shapes. As described herein, these processes can be used to make holes in the workpiece without using traditional machining techniques. These holes might be used in turbomachine components. Applicant's U.S. Patent publication 2015/0174784, which are herein incorporated by reference, describes the use of advanced methods of shaping and machining materials without the use of rotary-type machining processes.

Similarly, FIG. 1 illustrates a sub-process 100 that occurs in the process of producing a non-rotary precision shaped and machined through-hole. The process begins 101 where a workpiece is attached to a fixture allowing for through-hole production, which in turn is attached to the table of the non-spindle CNC holemaking machine tool 103. The cutting tool is secured or fixtured to the column of the machine tool 105 that contains a motor or other mechanism for driving the tool into the workpiece by simultaneously locating and then driving the cutting tool in any combination of the X, Y, and Z linear axes and the A, B, and C rotary axes, as known by the conventions of the art, necessary to present the cutting tool's axis perpendicular to the surface, in particular a non-linear surface, of the workpiece. Alternatively, the machine tool's table is movable by simultaneous motion of any combination of the linear and rotary axes for the purposes of locating the cutting tool perpendicular to the surface of the workpiece. In a substantially rapid motion, the cutting tool approaches and is positioned near the surface of the workpiece at a predetermined clearance level 109. An electromagnetic, pneumatic, or hydraulic drive mechanism located within the column operates to drive the cutting tool into the workpiece to a depth necessary so that a hole having the size and shape of the cutting tool's face is forced through the workpiece 111. As to the thickness of the workpiece, the invention is not restricted by non-spindle CNC holemaking processes. It is a matter of scale. The greater the thickness of the workpiece, the tougher the material of the controlled-fracturing cutting tool and the greater the diameter of its shank. In alternative embodiments, the appropriate forces may be varied depending on the thickness and types of the materials. The same for the CNC machine tool. This scaling would be in a manner similar to other types of machining, such as turning and milling, which are well known in the art.

Thus, the machine or apparatus for achieving non-spindle CNC holemaking though controlled-fracture machining uses a table upon which a fixture will be attached. The workpiece is positioned so that a controlled-fracturing cutting tool can be driven through the workpiece to make the through-hole. As described above, the controlled-fracturing cutting tool that is controlled by a CNC machine tool in the same manner as such multi-axis devices are by state-of-the art CNC machining centers or other similar means. The purpose of this simultaneous motion is to permit the controlled-fracturing cutting tool to drive through the workpiece along a tool path that is perpendicular to its surface. Those skilled in the art will recognize this is necessary when that surface is curved or otherwise not orthogonal to the table upon which the workpiece is fixtured. Whether or not the workpiece is pre-processed or not is only relevant to the invention as to whether it affects the material of the controlled-fracturing cutting tool and the speed at which it is driven through the workpiece, which are specified by the machining standards of the art and then adjusted by the absence of diverting force to rotation of the cutting tool. This adjustment permits using all of the force of driving a cutting tool into a workpiece to linear motion and therefore linear motion at a greater speed than currently possible with existing holemaking methods.

Those skilled in the art will further recognize that controlled fracture differs from hole punching techniques using a die as there is no fixed surface present directly behind the through-hole for preventing rearward movement due to forces that would occur. Thus, the non-spindle CNC holemaking techniques described herein using controlled fracturing, utilize a machine that is die-less i.e. having no die as the workpiece is held in position without a fixed supporting surface directly under the workpiece as would be present with a tool die used in prior art stamping or punching processes. Finally the through hole is produced without any preprocessing or modification of the workpiece that might be necessary in prior art techniques using metal rods or the like. Those skilled in the art will recognize that "preprocessing" means any processes or preparatory steps that are a prerequisite to the non-spindle CNC holemaking processes describe herein. The term "modification" means any changes or alterations to the workpiece as a prerequisite to the non-rotary holemaking processes.

Figure 2:
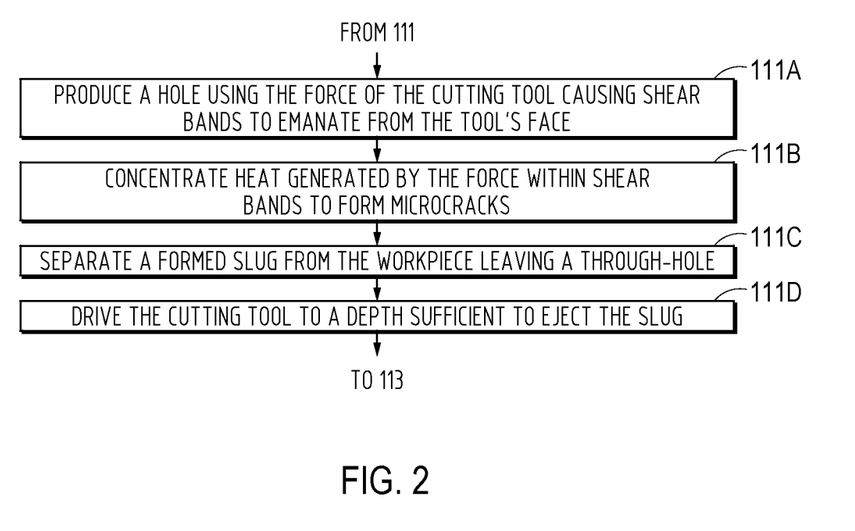
FIG. 2 is a flow chart diagram illustrating the sub-steps used in the non-spindle CNC hole making process shown in FIG. 1.

As illustrated in FIG. 2, the hole is produced by the force of the cutting tool driving into the workpiece sufficient to cause instantaneous strain in the material of the workpiece. Instantaneous strain occurs when a material's yield strength and breaking strength are exceeded simultaneously. Inducing instantaneous strain in the material of the workpiece by means of the method of this present invention causes shear bands to emanate along the perimeter of the cutting tool's face in a direction perpendicular to the face of the cutting tool 111A. Heat generated by this force is concentrated in the shear bands, causing the axial projection of banding along the perimeter of the cutting tool that from cracks which become connected under continued pressure from the cutting tool 111B. Cracking within the shear bands separates a slug from the workpiece leaving a through-hole having the size and shape of the cutting tool's face 111C. The cutting tool drives to a depth sufficient to eject the slug from the workpiece 111D. This process of holemaking is called "controlled fracturing" that occurs by simultaneously exceeding the yield strength and the breaking strength of the workpiece material so to prevent plastic deformation to a depth necessary to make a through-hole. A controlled fracture is produced by an impact which causes an axial projection of banding along the perimeter of the tool to produce a repeatable, precision shaped through-hole in the workpiece. As described herein, the use of the controlled fracturing process enables the through-hole to be formed without the use of a fixed surface, like that used with a punch machine having a standard die where a fixed surface would support the workpiece behind the through-hole. Moreover, the hole is produced without a counterstrike, die or other counter-tool used on the opposite side of the workpiece. Although the workpiece may be fixture or supported, no counter-tool is needed on the back side of the desired hole to create the hole.

Thus, controlled-fracturing to produce the through-hole is induced in the workpiece using steps of applying an abrupt, localized, and substantially extreme force of a cutting tool against the workpiece. This force must be sufficient to exceed the ultimate shear strength of the material of the workpiece. When the force is applied, shear bands form in the workpiece as a microstructure of cracks emanating in the direction of the cutting tool within the outside contour of the cutting tool as projected into the workpiece. Under the continued force of the cutting tool moving through the workpiece, this microstructure softens relative to the uncut material surrounding it, because the cracked material becomes highly fractured, even to the point of recrystallizing. Once softened the cutting tool shears this material from the workpiece as waste retaining almost all of the heat generated by the process, because its microstructure of cracks retards the transfer of heat to material outside of the microstructure. The end result of this controlled-fracturing process is a shape cut into the workpiece with the same contour as the cutting tool.

The force sufficient to propagate the shear bands for controlled-fracturing varies with the material of the workpiece. The cutting tool must apply at least 60,000 pounds of force per square inch (lbs/sq-in) of areal contact with the workpiece if it is cold-rolled mild steel; 80,000 pounds for alloy steel; 150,000 pounds for stainless steel; 50,000 pounds for titanium; 20,000 pounds for aluminum; and 50,000 pounds for aluminum-bronze. These forces can be applied as required to achieve the necessary surface footage for achieving controlled fracturing. Consequently, the only restriction upon the volumetric rate of material removal for non-rotary holemaking are the depth of penetration, and width of cut limitations of the cutting tool. Thus, at least 20,000 lbs/sq-in of force is typically used to create a through-hole using an impact induced force whose magnitude depends on material composition as well as the proportional nature of machining tool's shape and size. This distinguishes the invention from holemaking processes in prior art, in which the volumetric rate of material removal is restricted by the limitations of both the workpiece and the cutting tool. The end result is the optimization of the cutting tool's performance to its ideal for creating a through-hole.

Upon the face of the cutting tool reaching a predetermined hole depth, the column withdraws the cutting tool from the workpiece to a level sufficient to reset the cutting tool and re-position the workpiece, as necessary 113. This process is accomplished without the tool and the workpiece interfering with one another. Thereafter, a determination is made if the cutting tool is to be reset to produce another hole 115. If more holes are desired, the drive mechanism resets the cutting tool. By a combination of linear and rotary motion of either or both the table and column, the workpiece is re-positioned so that the face of the cutting tool is perpendicular to the centerline of the next hole 117.

Next, a determination is made if all the holes to be made are completed 119. If not, steps 111 to 119 are repeated as necessary. If more holes to be made by the non-rotary process require a different cutting tool, the column retracts the cutting tool from the work envelope 121. If additional holes are to be made with another cutting tool, steps 105 to 121 are repeated as necessary. Once a determination is made 123 that no further holes are needed with all variations of cutting tools using the non-rotary hole making process, the table positions the workpiece for removal from the machine tool 125. Thereafter, the process ends and is complete 127.

Hence, the present invention defines a method and apparatus for producing a though-hole using controlled fracturing using a machine that includes a table section for supporting a fixtured workpiece; a cutting toolholder section for holding at least one cutting tool comprising the steps of: securing a workpiece to a table of a non-spindle CNC holemaking machine tool such that no die is used; securing the cutting tool to the column of the machine tool; positioning a face of the cutting tool perpendicular to a centerline of a proposed hole; approaching the surface of the workpiece with the cutting tool to a predetermined clearance level; providing an impact force of at least 20,000 lbs/sq-in to impact the location of a proposed hole in the workpiece; driving the cutting tool into the workpiece using a linear force to exceed both the yield strength and the breaking strength of the workpiece material in a manner so to cause fracturing by adiabatic shear banding produced by the impact force; creating a plurality of adiabatic shear bands to emanate from the face of the cutting tool using the impact force of the cutting tool to form connecting cracks using the plurality of adiabatic shear bands; and forming a slug in the workpiece at the position of the hole using the force of the cutting tool such that a through-hole in the workpiece is formed at the position of the slug without a counterstrike, die or other counter-tool used on the opposite side of the workpiece to create the through-hole of a desired size and shape at the predetermined clearance level.

Those skilled in the art will recognize that controlled fracturing is superior to electrolysis, the material removal process employed by EDM, in terms of speed, precision, productivity, and applicability to non-metallic materials. Controlled fracturing is superior to ablation, the material removal process employed by laser cutting in terms of speed, precision, productivity, and the absence of burning and backwall strike damage. Controlled fracturing is superior to plastic deformation, the material removal process employed by hard tool drilling. Although both processes rupture the material of the workpiece to produce a hole, the instantaneous strain produced by the non-rotary motion of the cutting tool in controlled-fracture machining is the mechanical difference that mitigates and even eliminates the problems of plastic deformation. Because the strain on the material does not accumulate over an extended period of time but instead occurs instantaneously, the material is not torn from the workpiece, as is the case of plastic deformation caused by the rotation of a drill, but instead it is removed by fracturing along shear bands that are perpendicular to the face of the tool. Thus, a hole is rapidly produced in the size and shape of the tool face without the expansive heat of plastic deformation that arises as strain accumulates in the material. Additionally, the contour of the hole is clean and smooth without burrs or other defects since the fracturing force shears the hole instead of tearing material to produce the hole. Furthermore, varying the driving force of the tool may allow for controlled diffusion of the shear bands to produce both tapered and flared holes. For these reasons, controlled fracturing is superior to plastic deformation in terms of speed, precision, productivity, mitigation or elimination of burrs in metallic materials and delamination of carbon fiber composites, mitigation or elimination of cracking especially in carbon fiber composites, and production of non-round, tapered, and flared holes.

Figure 3:
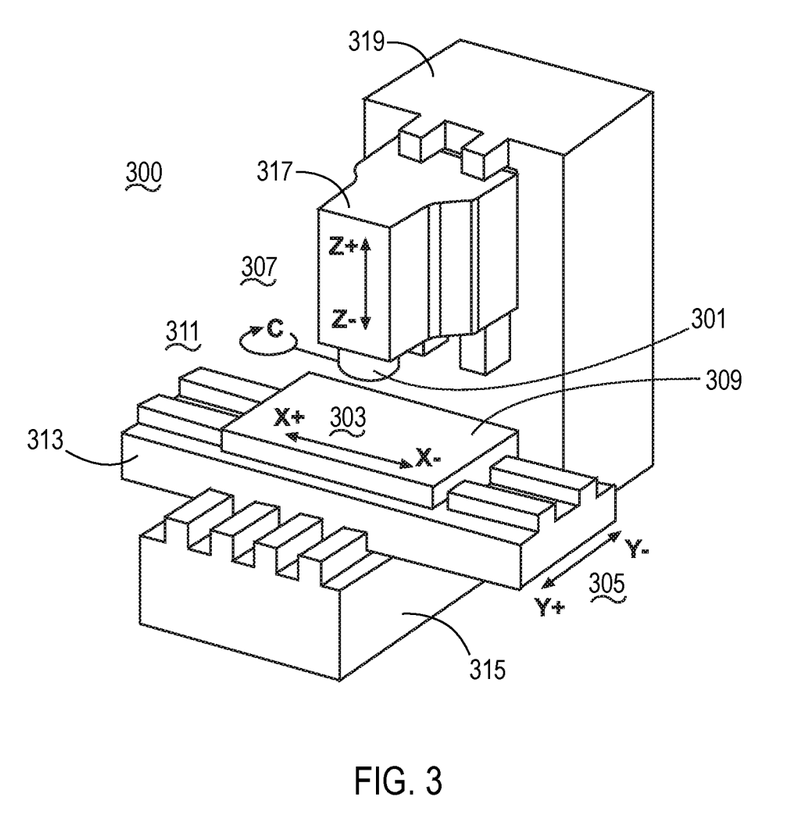
FIG. 3 is a perspective view of a non-spindle CNC machining apparatus in accordance with the "4-axis", the minimum axes required, embodiments of a non-spindle CNC holemaking apparatus in accordance with the present invention.

FIG. 3 is a perspective view of a non-rotary multi-axis machining apparatus in accordance with the "3-axis" and "4-axis" embodiments of a non-rotary holemaking apparatus in accordance with the present invention. The apparatus employing the non-rotary methods of the present invention can be embodied in a variety of configurations. In one embodiment, the multi-axis machining apparatus includes a base section for supporting the workpiece and a bridge section having a toolholder for fixturing, fastening and/or holding at least one machine tool. The bridge section typically moves in a channel in the base section for making a precision hole using controlled fracturing at some predetermined location. These embodiments are comparable to those of computer numerical controlled mills (known in the trade as "machining centers"), except that the present invention does not use a spindle to rotate a cutting tool in a continuous motion. Instead, the non-rotary cutting tool is moveable in a 3-dimensional work envelope and is used in accordance with various non-rotary holemaking embodiments of the present invention.

As seen in FIG. 3, a tool holder 301 is used to replace a spindle into which a non-rotating cutting tool can be affixed. The tool will typically have substantially the same shape as the hole to be made with the cutting tool's face fixed to a single direction to facilitate removal of material by means of controlled fracturing. The multi-axis machining apparatus operates to adjust the rotary machine tool about its longitudinal axis for optimizing the force of the machine tool to produce a through-hole in non-metallic material using non-rotary controlled fracturing machining processes.

The simplest embodiment of the present invention is a "3-axis" machine 300, which can drive the cutting tool along any one of the three linear axes 303, 305, 307, or any combination of them (under certain circumstances), that together define the machine's 3-dimensional work envelope. The cutting tool can be driven using a force generated from at least one from the group of electromagnetic, pneumatic, or hydraulic components. The "3-axis" machine 300 uses a plurality of channeled surfaces 313, 315 and 317, 319 for moving a holemaking tool along an X, Y and Z axis, separately or simultaneously, to position the cutting face of the tool at the location specified to produce a hole having a predetermined size and shape in the workpiece (not shown). As described herein, the workpiece may be held in a fixed position and/or suspended using various methods so that no support surface is positioned behind the workpiece when producing the through-hole.

Still yet another embodiment is a "4-axis" machine, which has all of the 3-axis linear motion of the "3-axis" machine in addition to a "rotary axis" 311 to allow the cutting face of the tool to be positioned at any angle relative to the surface of the workpiece to produce a hole. This is to be distinguished from a machine using a tool holder and spindle which rotates the cutting tool about the centerline axis of the spindle to provide the torque necessary for the cutting tool to remove material from the workpiece. Thus, the "4-axis" machine includes three linear axes and one rotary axis that are mechanically and/or electronically controlled. The mechanism for the rotary fourth axis can be either a rotary tool holder 301 to which the cutting tool is attached or a rotary table 309 to which a workpiece is attached. By the addition of similar rotary-axis mechanisms the invention can be embodied as a "5-axis", "6-axis", and "7-axis" machine to position the cutting tool and/or workpiece to provide greater access to all surfaces of the workpiece across a wider range of angles in a single fixture. By providing rotation of the cutting tool and/or the rotary table 309, the "4-axis" and other multiple rotary-axis machine embodiments are sufficient to produce a hole in a workpiece by means of controlled fracturing as described herein.

Thus, the method(s) as illustrated in FIGS. 1 and 2 and the apparatus shown in FIG. 3 provide a precision holemaking process and apparatus that can be used without the distorting effects of heat that are produced by EDM, laser-cutting, or hard tool drilling processes. As seen in FIG. 3, an embodiment of the present method also operates using a machine tool configured similarly to a multi-axis machining center for milling to facilitate the ready integration of proven automation technologies. As described herein, the substantially large forces required to induce controlled fracturing varies according to a number of factors. These include the composition and/or type of material of the workpiece, the material of the cutting tool, and the shape and/or size of the cutting tool. However, those skilled in the art will recognize that the major factor in providing the non-rotary making process is the material composition of the workpiece. Controlled fracture initiates when the yield point and breaking strength of the material are reached simultaneously. Numerical data for yield point and breaking strength as used with various material compositions can be obtained from standard reference materials.

Thus, using the non-rotary machining methods using controlled fracturing as described herein, holes are formed by a machining head which drives the tool into a product surface such as the blade of a blisk to produce the hole. The shape of the hole is determined by the perimeter of tool's cutting edge. The depth is determined by the length of the stroke of the cutting tool which is determined by a machining head. The rectangular and/or axial coordinate of the hole are determined by the position of the machining head relative to the work piece. Thus, no torque is required to cut the hole into the blade. The rate of production is several times faster than drilling. The principals of the invention exist within the body of well-established conventions, specifications, and practices in the machining arts. What is novel is that the method of holemaking goes beyond what is known to the art to make holes in difficult workpieces (1) more precisely in size, shape, and location, (2) at greater rates of holemaking, and (3) with minimal or no post-processing such as deburring than is possible with holemaking methods currently known to the art.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for producing a though-hole using controlled fracture machining comprising:
    fixturing a workpiece to a table attached to a base section such that the workpiece is positioned in a manner to produce a through-hole such that no die is used;
    positioning a face of a cutting tool perpendicular to the centerline of the proposed hole;
    approaching the surface of the workpiece with the cutting tool to a predetermined clearance level;
    driving the cutting tool using linear force into the workpiece at the predetermined though-hole area using at least 20,000 lbs/sq-in of an impact induced force to produce controlled fracturing by exceeding both the yield strength and the breaking strength of the workpiece material by an impact force which causes the axial projection of adiabatic shear banding of the material along the perimeter of the cutting tool to produce a precision shaped through-hole without plastic deformation to a depth to make a through-hole without driving completely through the workpiece;
    creating the precision shaped through-hole of a desired size and shape using a drive mechanism striking the workpiece;
    withdrawing the cutting tool from the workpiece to a predetermined level;
    resetting the cutting tool using the drive mechanism;
    repositioning the workpiece so the face of the cutting tool is perpendicular to the centerline of a subsequent hole; and
    retracting the cutting tool from a work envelope upon completion of the non-rotary machining process.

2. A method for producing a through-hole as in claim 1, further comprising the step of:
    selecting the cutting tool so to match the size and shape of the desired through-hole.

3. A method for producing a through-hole as in claim 1, further comprising the step of:
    selecting the cutting tool so to match the size and shape of the desired through-hole.

4. A method of producing a though-hole by controlled fracture machining in a plastic or metal workpiece material comprising the steps of:
    securing a workpiece to a table of a multi-axis machining apparatus without the use of a die;
    selecting the cutting tool so to match the size and shape of a desired through-hole;
    positioning a face of a cutting tool perpendicular to the centerline of a proposed through-hole;
    adjusting the cutting face of the machine tool by rotating the cutting tool or workpiece so that an optimal cutting force can be achieved;
    approaching the surface of the workpiece with the cutting tool to a level sufficient to clear obstructions and to allow acceleration of the cutting tool to the speed required for controlled fracturing;
    driving the cutting tool using linear force, without rotation, about its axis into the workpiece using an impact force of at least 20,000 lbs/sq-in through use of controlled fracturing to exceed the yield strength and the breaking strength of the workpiece material by an impact force which causes the axial projection of adiabatic shear banding of the material along the perimeter of the tool to produce a through-hole to a depth necessary to make a through-hole without driving completely though the workpiece or using a fixed surface to support the workpiece; and
    creating a hole conforming to the perimeter of the cutting tool's face using a drive mechanism striking the workpiece.

5. A method for producing a though-hole using controlled fracturing using a machine that includes a table section for supporting a fixtured workpiece, a cutting toolholder section for holding at least one cutting tool comprising the steps of:
    securing a workpiece to a table of a non-spindle CNC holemaking machine tool such that no die is used;
    securing the cutting tool to the column of the machine tool;
    positioning a face of the cutting tool perpendicular to a centerline of a proposed hole;
    approaching the surface of the workpiece with the cutting tool to a predetermined clearance level;
    providing an impact force of at least 20,000 lbs/sq-in to impact the location of a proposed hole in the workpiece;
    driving the cutting tool into the workpiece to a depth necessary to make the through-hole without driving completely through the workpiece using a linear force to exceed both the yield strength and the breaking strength of the workpiece material in a manner so to cause fracturing by adiabatic shear banding produced by the impact force;
    creating a plurality of adiabatic shear bands to emanate from the face of the cutting tool using the impact force of the cutting tool to form connecting cracks using the plurality of adiabatic shear bands; and
    forming a slug in the workpiece at the position of the hole using the force of the cutting tool such that a through-hole in the workpiece is formed at the position of the slug by striking the workpiece to create the through-hole of a desired size and shape at the predetermined clearance level.

* * * * *